Nov. 5, 1957 M. BITZER 2,811,952
WINDSHIELD WIPER ARRANGEMENT
Filed April 30, 1956 3 Sheets-Sheet 1
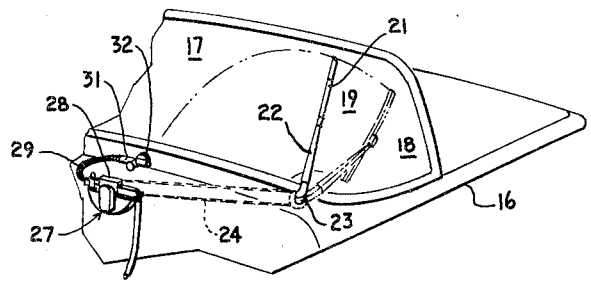
Fig.1
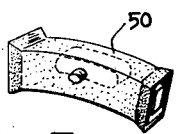
Fig.7
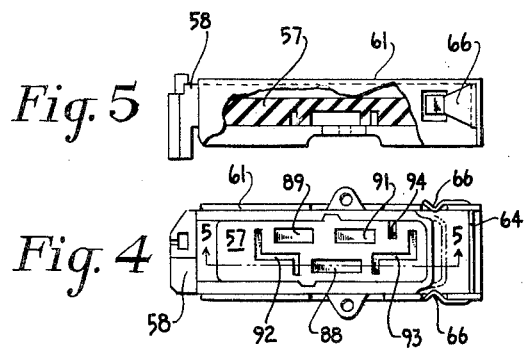
Fig.5
Fig.4
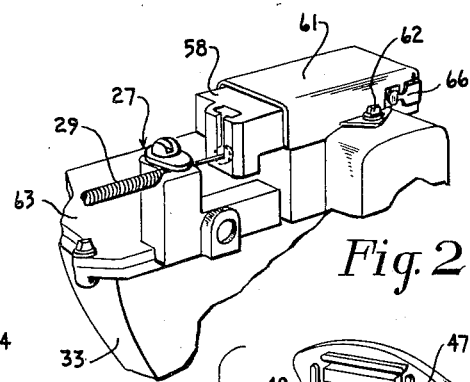
Fig.2
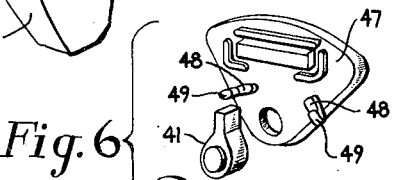
Fig.6
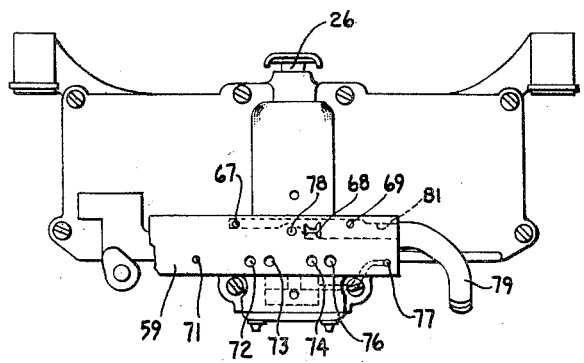
Fig.3
INVENTOR.
Martin Bitzer
BY
Bean Brooks Buckley & Bean
ATTORNEYS Nov. 5, 1957 M. BITZER 2,811,952
WINDSHIELD WIPER ARRANGEMENT
Filed April 30, 1956 3 Sheets-Sheet 2

INVENTOR.
BY Martin Bitzer
Bean Brooks Buckley + Bean.
ATTORNEYS

Nov. 5, 1957 M. BITZER 2,811,952
WINDSHIELD WIPER ARRANGEMENT
Filed April 30, 1956 3 Sheets-Sheet 3

INVENTOR.
Martin Bitzer
BY
Bean Brooks Buckley + Bean.
ATTORNEYS

United States Patent Office 2,811,952
Patented Nov. 5, 1957

2,811,952

WINDSHIELD WIPER ARRANGEMENT

Martin Bitzer, Kenmore, N. Y., assignor to Trico Products Corporation, Buffalo, N. Y.

Application April 30, 1956, Serial No. 581,585

7 Claims. (Cl. 121—97)

This invention relates to a vehicle windshield wiper arrangement, and more particularly to a wiper motor adjustable for two ranges of wiper travel.

Many of the current model vehicles have a windshield of the type often referred to as the panoramic, or wraparound style, which gives an increased field of vision due to elimination of the corner posts used at the sides of the conventional windshield. The panoramic style windshield, while providing a definite advantage as far as field of vision is concerned, introduces problems in the wiping thereof, because the wiper blades must wipe the frontal and lateral sections of the windshield, if full benefit of the windshield is to be realized. For example, longer and more complicated wiper and wiper arm assemblies are necessitated, the wiper embodying a superstructure that compels conformance of the blade to the surface being wiped, and the wiper carrying arm incorporating a normalizing feature for maintaining the wiper substantially normal to the surface being wiped. A wider arc of travel is required of the wiper to encompass both the frontal and lateral sections of the windshield, thus involving a longer time interval between successive strokes across the primary sight line, i. e., on the frontal sections. The wider arc of travel, while satisfactory for motor vehicle travel at moderate speeds and/or light precipitation, may not provide adequate wiping at high vehicle speeds and/or heavy precipitation.

To meet this problem, a two-range wiper system has been developed whereby the arc of wiper travel may be regulated for either a long arc to wipe both the frontal and lateral sections of the windshield, or a shorter arc to wipe only the frontal section of the windshield, such a system being disclosed in copending patent application Serial No. 455,211, filed September 10, 1954. The shorter arc wiper movement will have increased oscillation frequency, thus providing increased wiping action at high vehicle speeds and/or in heavy precipitation.

This invention represents an improvement over that disclosed in the aforesaid application, and briefly comprises a wiper motor control arranged integral with the motor, which control may be remotely operated to achieve long, or short arc movement of the wiper, as desired by the operator. The operation of the motor control is accomplished in a very simple and reliable manner, by means of a single connection between a control knob and the motor control.

The main object of this invention is to provide a wiper motor having a vacuum shifted distributing valve, with an integral control means adapted for remote operation to achieve either a long, or a short arc wiper movement as desired by the operator.

A further object of the invention is to provide a wiper motor with an integral control means which can be operated in a simple and reliable manner by only a single connection with a control knob.

These and further objects and features of the invention will become more apparent from the following description and the accompanying drawings wherein:

Fig. 1 is a fragmentary perspective view of a motor vehicle equipped with a wiper motor including a motor control embodying the present invention;

Fig. 2 is a fragmentary perspective view of the wiper motor of Fig. 1;

Fig. 3 is a top plan view of the wiper motor with the control valve removed;

Fig. 4 is a bottom plan view of the control valve used in the wiper motor;

Fig. 5 is a side view of the control valve, with a partial section view, as seen from line 5—5 in Fig. 4;

Fig. 6 is a perspective view of certain elements of a valve mechanism used in the wiper motor ;

Fig. 7 is a perspective view of a distributing valve used in the wiper motor;

Figure 8:
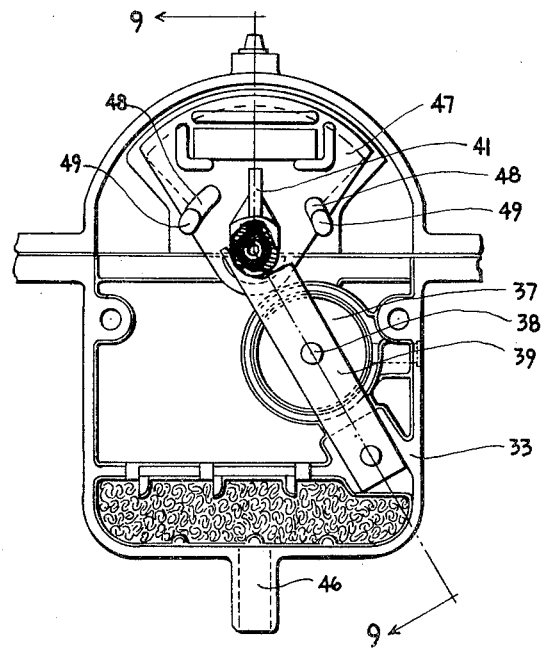
Fig. 8 is an end view of the wiper motor with an end cover removed.
Figure 9:
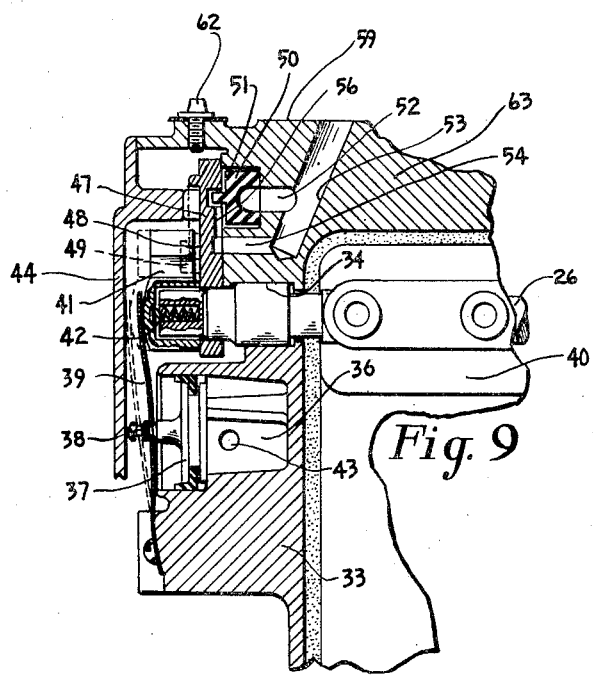
Fig. 9 is a section view as seen from line 9—9 in Fig. 8.

Referring to the drawings, and more particularly to Fig. 1, the numeral 16 designates a motor vehicle having a windshield of the panoramic, or wraparound, type with a frontal area 17 joined to lateral areas 18 by way of connecting crest portions 19. A pair of wipers, one being shown at 21 and carried by an arm 22 fixed to a rockshaft 23, is arranged to wipe a portion of the frontal area 17 and the lateral areas 18. The rockshafts are connected by a cable or other linkage 24, to a motor shaft 26 of a vacuum-operated wiper motor 27 which has a control valve arrangement 28, operable by a Bowden wire 29 coupled to a rack and pinion unit 31, having a rotatable knob 32 which can be manipulated for movement of the Bowden wire by the vehicle operator.

Numeral 33 indicates a motor housing having a bearing recess 34 for the support of one end of motor shaft 26 on which is mounted a vane-like piston 40 for oscillating movement in a motor chamber 35. A piston chamber 36 arranged in the housing, is adapted to receive a piston 37, having a stem 38 on the outer side thereof. A spring-like lever 39, having one end affixed to the housing, is connected at its medial point to the stem 38, the end of the lever being arranged to engage at the opposite end a valve moving means in the form of a kicker lever or arm 41. The latter is positioned on the end of the motor shaft 26 for rotation therewith, however, it is further arranged for axial movement relative to the motor shaft. A compression spring 42, positioned within the end of the motor shaft, is arranged to exert a force against the kicker lever to urge the latter axially outward on the motor shaft. An end cover 44 removably affixed to the motor housing 33, has an opening 46 to vent the region between the cover and motor housing to atmosphere. A port 43, located within the piston chamber 36, forms the end of a vacuum passageway 45 which is arranged for introduction of a vacuum into the piston chamber resulting in movement of the piston 37 to shift the lever 39, so that the kicker lever 41 will move inwardly upon the motor shaft 26 against the force of compression spring 42.

Mounted upon the motor shaft for relative rotary movement therewith, is a shuttle member 47 having an abutment means in the form of two pairs of shoulders 48, 49, on the outer side thereof. The shoulders are arranged to limit the oscillatory movement of the kicker lever 41; shoulders 48 are adapted for abutment by the kicker lever when the wiper motor is driving the wipers on short arc wiper movement, while shoulders 49 are adapted for abutment by the kicker lever when the wiper motor is driving the wipers on long arc wiper movement. It will be seen that when vacuum is applied in the piston chamber 36, a pressure differential will be established upon the piston 37 to cause it to be moved, shifting the lever 39 to urge the kicker 41 inwardly upon the shaft so that it oscillates between the short arc shoulders 48, while when the piston chamber is at atmospheric pressure, the spring 42 will shift the kicker 41 outwardly on the shaft so that it oscillates between the long arc shoulders 49.

Shuttle member 47 is adapted to control a vacuum circuit for movement of a distributing valve 50, arranged in a valve chamber 51 whereby the latter will connect a vacuum port 52 with passageways 55 and 60, which are arranged in a circuit leading to opposite sides of the wiper motor piston 40, to cause the piston to oscillate and provide the desired movement to the wipers. A passageway 53 connects with the vacuum port 52, and also with a passageway 54 leading to a series of passageways 56 formed on the inner side of the shuttle member 47. The manner in which the shuttle member is adapted to function to provide movement of the valve 50 under vacuum, is further set forth and claimed in Patent No. 2,803,225, a detail description of such valve structure and function not being necessary for a full understanding of the two range wiper motor structure forming the inventive concept of this disclosure.

The operation of the wiper motor is regulated by the control valve 28 which includes a rubber-like slide valve 57 encased in a housing 58. The housing 58 is movable to position the slide valve for various conditions of wiper motor operation, and in certain respects is similar in structure and function to the slide valve shown in Patent 2,617,136.

Slide valve 57 is guidingly positioned atop a valve head, or seat 59 by a retainer 61 the latter being detachably secured by screws 62 to the valve head. A spring-like clip 64 arranged on the end of the valve housing 58, has a pair of fingers 66 which are adapted to engage the sides of the valve retainer 61 when it is moved to a maximum position upon the valve head. The clip not only serves to hold the valve in such position but prevents such maximum movement of the valve without conscious effort on the part of the vehicle operator, so that the wiper motor will not be regulated for short arc wiper movement unless such operation is desired. The valve head has a plurality of ports 67, 68, 69, 71, 72, 73, 74, 76, 77, and 78, to which are connected passageways leading to certain portions of the wiper motor to effect wiper motor operation.

A nipple 79 is connected to the end of a main vacuum passageway 81 having ports 67, 68, and 69 opening thereinto. Port 68 is slotted and has an I-shape, the end toward the nipple 79 being of increasing cross-sectional area to allow for increased air flow resulting in faster wiper motor operation as the slide valve is moved on the valve head. Port 78 forms one end of a passageway 82, the other end of the passageway terminating in the vacuum supply port 52. Passageway 55 connects with port 73, while passageway 60 connects with port 74. Passageway 83 connects port 72 with the motor chamber 35 on one side of the piston 40, while passageway 84 connects the port 76 to the motor chamber on the other side of the piston 40. A parking seat 86 is located in the motor chamber 35 and a passageway 87 connects the interior of the parking chamber with the port 71. When it is desired to park the piston 40, passageway 87 will connect the vacuum source to the parking chamber thus causing a pressure differential upon the piston 40, whereupon it will be seated against the edge of the parking chamber, in a well known manner.

The slide valve 57 has a plurality of grooves on its lower surface for establishing communication between various ports when the slide valve is in different positions relative to the valve head 59 during wiper motor operation. Groove 85 is arranged to interconnect ports 78 and 68; groove 89 interconnects ports 72 and 73; groove 91 interconnects ports 74 and 76; groove 92 interconnects ports 67 and 71; groove 93 interconnects ports 69 and 77; and groove 94 is arranged to connect port 76 to atmosphere. The nipple 79 is connected by a hose, or conduit (not shown), to a source of vacuum such as the engine manifold of the motor vehicle.

Figure 10:
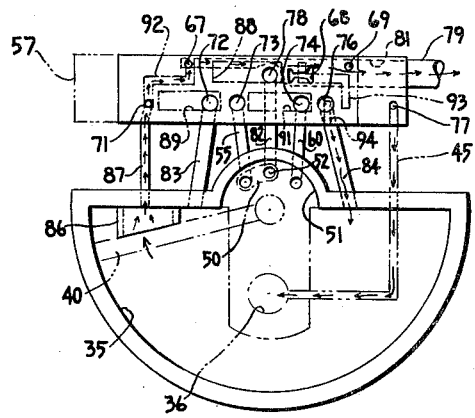
Fig. 10 is a schematic view of the wiper motor illustrating the vacuum circuit created by the position of the control valve when the control valve is set for parking of the wiper.
Figure 11:
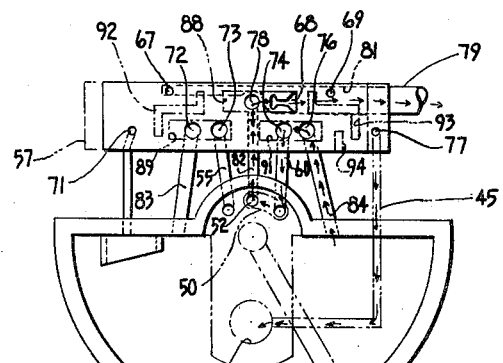
Fig. 11 is a schematic view of the wiper motor illustrating the vacuum circuit created by the position of the control valve when the control valve is set for long arc wiper travel.
Figure 12:
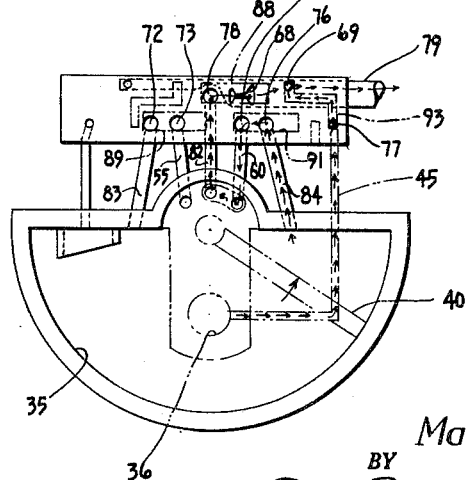
Fig. 12 is a schematic view of the wiper motor illustrating the vacuum circuit created by the position of the control valve when set for short arc travel.

Referring now more particularly to Figs. 10, 11 and 12, said illustrations represent the position of the slide valve 57 for parking the wiper motor, for long arc wiper movement, and for short arc wiper movement respectively.

It will be seen that when the slide valve 57 is in the Fig. 10 position, i. e., parking, which represent one extreme position of the slide valve, port 67 will be in communication with port 71 via groove 92, thereby connecting the main vacuum passageway 81 with the parking seat 86 by way of passageway 87, while passageway 84 will be open to atmosphere by way of port 76 and groove 94. Under such condition, the wiper motor piston 40 will be held against the parking seat 86 due to the constant difference of pressure acting on the sides thereof, and the motor will remain parked.

When the slide valve 57 is shifted to the Fig. 11 position, i. e., long arc wiper movement, port 68 will be in communication with port 78 via groove 88, thereby connecting the main vacuum passageway 81, with passageway 82, thus supplying a vacuum to either side of the wiper motor piston 40 by virtue of the valve 50 connecting the vacuum supply port 52 with either passageways 55 or 60. When the vacuum supply is connected to the passageway 55, a vacuum circuit to the wiper motor chamber 35 will be established via port 73, groove 89, port 72, and passageway 83, while when the vacuum supply is connected to the passageway 60, vacuum circuit to the wiper motor chamber will be established via port 74, groove 91, port 76, and passageway 84. It will be further seen that in said position of the slide valve, the port 77 will be uncovered thus allowing atmospheric-pressure to exist in passageway 45 and the piston chamber 36, thereby allowing movement of piston 37 and the spring lever 39, so that the compression spring 42 can urge the kicker 41 outwardly on the piston shaft 26 whereby the kicker will oscillate between long arc shoulders 49. As long as the slide valve is in the Fig. 11 position, the wiper motor will be operated so that the wiper 21 will move upon the windshield frontal area 17, crest portion 19, and lateral area 18.

When the slide valve 57 is shifted to the Fig. 12 position, i. e., short arc wiper movement, which represents the other extreme position of the slide valve, the porting and groove arrangement will be similar to that of the Fig. 11 position, as far as vacuum supply to the wiper motor chamber 35 is concerned, however, passageway 45 instead of being connected to atmosphere, will now be connected to the vacuum source by reason of the groove 93 interconnecting ports 77 and 69. As a result, a pressure differential will exist on the piston 37 so that movement thereof will occur inwardly within the piston chamber 36, thus moving the spring lever 39 to urge the kicker 41 inwardly upon the motor shaft 26 whereby the kicker will oscillate between short arc shoulders 48. As long as the slide valve is in the Fig. 12 position, the wiper motor will be operated so that each wiper 21 will be caused to wipe only the frontal area 17 of the windshield. It will be appreciated that the short arc wiper movement, i. e., oscillating frequency, takes place in less time than the long arc wiper movement. Accordingly, the short arc wiper movement will be utilized by the vehicle operator for windshield wiping operations at high vehicle speeds, and/or in heavy precipitation.

From the foregoing description, it will be seen that a wiper motor having a vacuum operated distributing valve, may be operated from a remote point to provide two ranges of wiper arc movement, and with but a single connection between the control knob 32 and the wiper motor.

The foregoing description has been made in detail without thought of limitation since the inventive principles involved are capable of assuming other physical embodiments without departing from the spirit of the invention and scope of the appended claims.

What is claimed is:

1. A windshield wiper motor operable to provide two ranges of wiper travel and comprising in combination a motor piston operatively connected to a motor shaft for oscillatory movement in a motor chamber, said motor piston operable for either long or short arc movement, a first valve means movable in response to fluid pressure differential applied thereto for directing motor operating fluid to the motor chamber alternately on opposite sides of the motor piston to cause movement of the latter, a valve moving means responsive to oscillatory movement of the motor shaft to effect movement of said first valve means, arc limiting means associated with said valve moving means and positionable to regulate the motor piston for either long or short arc movement, positioning means responsive to motor operating fluid to position the arc limiting means, and a single valve operable to connect motor operating fluid to the first valve means and selectively to said positioning means.

2. A windshield wiper motor operable to provide two ranges of wiper travel and comprising in combination a motor piston operatively connected to a motor shaft for oscillating movement in a motor chamber, said motor piston operable for either long or short arc movement, a valve means movable in response to fluid pressure differential applied thereto for directing a subatmospheric pressure fluid to cause a pressure differential on opposite sides of the motor piston resulting in oscillatory movement thereof, a valve moving means responsive to oscillatory movement of the motor shaft to effect movement of the valve means, arc limiting means associated with said valve moving means and positionable to regulate the motor piston for either long or short arc movement, positioning means responsive to sub-atmospheric pressure fluid to position the arc limiting means, and a slide valve operable to connect a sub-atmospheric pressure fluid source to said valve means and selectively to said positioning means.

3. A windshield wiper motor operable to provide two ranges of wiper travel and comprising in combination a motor piston operatively connected to a motor shaft for oscillatory movement in a motor chamber, said motor piston controlled for either long or short arc movement, a valve means movable in response to a fluid pressure differential applied thereto for directing a vacuum alternately to opposite sides of the motor piston whereby a pressure differential is created on the latter resulting in movement thereof, a valve moving means responsive to oscillatory movement of the motor shaft to effect movement of the valve means, said valve moving means including an arc limiting means positionable to control the motor piston movement, a vacuum responsive means operable to position the arc limiting means, and a slide valve operable to connect vacuum to the valve means and selectively to the vacuum responsive means for the operation thereof.

4. A windshield wiper motor for use on a panoramic type windshield and comprising in combination a motor housing, a motor piston affixed to a motor shaft, said motor piston being arranged for oscillatory movement in a motor chamber formed in the housing, means for connecting the motor to a source of vacuum, a slide valve positioned upon the housing and arranged for selectively connecting the vacuum supply to passageways formed in the motor, a vacuum operated distributing valve adapted upon movement for connecting a vacuum supply passageway alternately to opposite sides of the motor piston, a shuttle member arranged to direct vacuum for moving the distributing valve, a kicker mounted upon the end of the shaft for oscillatory movement therewith and arranged for axial adjustment in two positions, shoulder means upon the shuttle member responsive to one axial position of the kicker whereby the shuttle member causes movement of the distributing valve when the kicker is oscillating between two arcuate points, said shoulder means being further responsive to the other axial position of the kicker whereby the shuttle member causes movement of the distributing valve when the kicker is oscillating between two different arcuate points, and a vacuum responsive piston means to move said kicker axially into one position of axial adjustment, said slide valve being adapted to supply vacuum to a passageway leading to said piston means.

5. A windshield wiper motor according to claim 4, wherein slide valve moving means are provided whereby the slide valve may be operated from a point remote from the wiper motor.

6. In a windshield wiper motor having a motor shaft and a motor piston mounted upon the shaft for oscillatory movement in a motor chamber, a slide valve means positionable to effect motor operation, a distributing valve movable in response to fluid pressure differential for alternately exposing opposite sides of the motor piston to a source of vacuum to cause oscillatory movement thereof, a shuttle member having passageway means positionable to establish fluid pressure differential on the distributing valve, a kicker lever mounted on the end of the shaft for rotary movement therewith and arranged for axial adjustment in two positions, a compression spring arranged between the kicker lever and the end of the shaft, shoulder means upon the shuttle member engageable by the kicker lever in one position of axial adjustment to effect movement of the shuttle member when the motor piston is oscillating on long arc movement, said shoulder means being further arranged for engagement by the kicker lever in a second position of axial adjustment to effect movement of the shuttle member when the motor piston is oscillating on short arc movement, and a kicker lever operating means including a kicker lever piston having a stem portion and a spring lever affixed at one end and having the other end in engagement with the kicker lever, said spring lever being connected at its medial portion to said stem portion, said kicker lever piston being movable in response to vacuum to move the spring lever whereby the kicker lever will be moved to its second position of axial adjustment, said spring lever being biased to allow movement of the kicker lever to its first position of axial adjustment in the absence of vacuum being applied to the kicker lever piston, said slide valve being positionable to connect the distributing valve with a source of vacuum and being further positionable to expose the kicker lever piston to vacuum.

7. A windshield cleaner motor comprising a housing having a motor chamber and a valve chamber, a shaft journaled in the motor chamber and having one end extending into the valve chamber, a piston in the motor chamber for driving the shaft, automatic valve mechanism within the valve chamber including a kicker carried by the extending end of the shaft and shiftable axially therealong between two operating positions to effect long and short strokes of the piston, said housing being formed with an auxiliary motor including a chamber opening into the valve chamber and a piston operating in the auxiliary motor chamber, means operatively connecting the second piston to the kicker to so axially shift the same from one to the other of its two operating positions, and a stroke selector valve connected to the auxiliary motor for selecting the operative position of the kicker, said selector valve being further arranged to provide simultaneous operation of the cleaner motor.

References Cited in the file of this patent

UNITED STATES PATENTS 2,761,429  Krohm _____ Sept. 4, 1956